United States Patent Office 2,844,479
Patented July 22, 1958

2,844,479

ELECTRICAL JOINT COMPOSITION

Mike A. Miller, New Kensington, Pa., assignor to Aluminum Company of America, Pittsburgh, Pa., a corporation of Pennsylvania No Drawing. Application June 20, 1950
Serial No. 169,294

6 Claims. (Cl. 106—14)

This invention relates to mechanical joints between metal electrical conductors as distinguished from soldered or welded joints, and it is especially concerned with reducing the electrical resistance offered by mechanical joints.

In electric power transmission systems it is frequently necessary to join one metal conductor unit, such as bus bars or cable, to another unit because, for most installations, it is not feasible, if not impossible, to employ a single continuous conductor from the generator to the machine or apparatus which consumes the power. Also, fittings must be attached to the conductors, particularly at terminals, which carry current and form a part of the transmission system. Although it is possible, and even desirable, in some instances to weld or solder one conductor to another, in many cases, especially in systems where heavy power loads are carried, the formation of such integral joints is not advantageous. For example, in installing bus bars, it is more convenient and usually much quicker to clamp or bolt them together than to weld them, and, likewise, such a mechanical joint is more easily disassembled than one which has been soldered or welded. Also, at times, it is necessary to join conductors of dissimilar metals, which present some difficulties from a welding standpoint.

In speaking of mechanical joints, it will be understood that this term is applied to those joints where contact between conductors is established and maintained by mechanical means. Thus, fittings may be compressed upon a conductor, or conductors may be bolted or clamped together. In all of these cases, a portion of the surface of one conductor is held in contact with a portion of the surface of another conductor by mechanical means. Usually the ends of the conductors are overlapped, rather than butted together, to form a good durable joint.

Metal conductors generally are coated with a natural oxide film, especially metals such as aluminum, with the result that actual metal to metal contact is not established in a mechanical joint. Furthermore, such coatings offer considerably more resistance to the flow of electric current than does the metal. The resistance, of course, increases with the thickness of the oxide film. Where the conductors become heated by passage of the current or by other means, especially where there are intervening cooling periods resulting in contraction of the metal and a possible loosening of the joint, the oxide film tends to grow and in consequence the resistance increases over a long period of time. While the electrical resistance of a single joint may be very small, yet when multiplied by the number of joints throughout the system, in which the current passes, the efficiency of power transmission is measurably affected. Moreover, if the joint is not properly protected, corrosion may occur between the overlapping surfaces and thus further increase the electrical resistance. For convenience this resistance to the flow of an electric current in mechanical joints may be called contact resistance.

The principal object of this invention is to provide a substance which will reduce the contact resistance between mechanically joined metallic electrical conductors and maintain the low resistance under weathering conditions, especially on exposure to moisture. A particular object is to provide a substance for reducing the contact resistance between aluminous conductors in a mechanical joint and retaining the reduced resistance in the presence of moisture.

I have found that the interposition of substantially water insoluble grease miscible hydrofluoric acid treated aliphatic, aromatic and heterocyclic amines and aliphatic amides containing 8 or more carbon atoms between mechanically joined metallic electrical conductors greatly reduces the contact or electrical resistance offered by the joint. For the sake of convenience the hydrofluoric acid treated amines and amides used for this purpose are called electrical joint compounds. No subsequent treatment of the compound or joint is required in order to bring about the desired reduction in contact resistance. The joint compound may be applied in any convenient manner such as by daubing or painting or by dipping in the liquid compound or mixture containing an electrical joint compound. The simplicity of the application and the great effectiveness of the compound offer very important advantages in constructing and operating a power transmission system. Still another advantage resides in the permanency of the lowered electrical resistance under moist conditions, for the compound is substantially insoluble in water and hence the effect upon the resistance persists as long as the compound is present. In other words, the compound does not deteriorate with respect to maintaining a low electrical resistance in the joint. Furthermore, the compound can undergo heating, such as occurs during passage of a current through the joint, and yet not lose its effectiveness in decreasing the contact resistance in the joint. Such stability is of special value where heavy currents are carried by the conductors, and the resistance of the joints would otherwise increase with continued service.

The electrical joint compounds which I employ are products of a reaction, absorption or solution between hydrofluoric acid and a substance selected from the group consisting of aliphatic, aromatic and heterocyclic amines and aliphatic amides and their substitution products having a total number of 8 or more carbon atoms. It is to be understood that the substitution products of the amines and amides are those substances which still retain the basic characteristics of the parent compound. For this reason, the terms "amines" and "amides" are used herein in a generic sense unless otherwise indicated. The products resulting from the action of the acid upon the foregoing amines and amides are characterized by their substantial insolubility in water and their miscibility in grease and oil. The expression, substantial insolubility, as here employed, means that if the substance is soluble in water, the solubility is only very slight, that is, insufficient to permit any leaching or washing out from the joint when exposed to water or a moist atmosphere. Many of the products, of course, are completely insoluble in water. The term, miscibility, means that they are mutually soluble in the usual hydrocarbon greases and oils.

The physical form of the electrical joint compounds at room temperature varies with their composition, some being liquids while others are of a paste-like consistency. The choice of a compound for a particular joint may be influenced by its physical state and the desired method of applying it to the conductors.

The amines and amides which are useful for my purpose, as mentioned above, are those which contain 8 or more carbon atoms and are classified as aliphatic, aromatic and heterocyclic amines and aliphatic amides and their substitution products. Examples of suitable aliphatic amines are: 2-ethylhexylamine, 3-di-n-amyl-aminopropylamine, di(2-ethylhexylamine), dodecylamine, didodecylamine, dioctadecylamine, trihexylamine and tri-n-amylamine. Aromatic amines such as the following can be employed: phenyl ethanolamine, 3-phenylpropylamine, ethylphenylethanolamine, phenyldiethanolamine, o - dimethylaminoethyl-p-octyl phenol, octylphenoxyethoxy-ethyldimethylamine and 4-amino-3-pentadecyl phenol. The heterocyclic amines are illustrated by substituted azoles, azolines, oxazolines, glyoxaline, azines, oxazines, and morpholine having 8 or more carbon atoms and indole. Of particular value are the substituted oxazolines of high molecular weight, especially those having a weight of at least 300, some examples of which are 2-pentyl-4, 5-dimethyl-4-hexanooxyethyl-2-oxazoline, 2-pentyl-4, 4-bis (hexanooxymethyl-2-oxazoline, and 2-nonyl-4-ethyl-4-caproxymethyl-2-oxazoline. The structural formula of the substituted oxazolines is illustrated by the formula of the last named compound which is as follows:

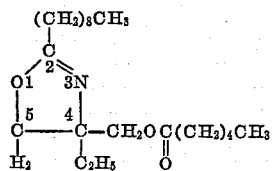

The substituted oxazolines are well known substances which may be prepared according to the methods shown in U. S. Patents 2,372,409, 2,372,410 and 2,504,951. Other examples of the heterocyclic amines are phenyl morpholine and 1-hydroxyethyl-2-heptadecenyl glyoxalidine. Examples of aliphatic amides are n-hexadecane amide and n-octadecane amide. It will be understood that particular compounds may be classified in one of more of the above groups but this does not affect the fact that they are useful in forming the desired joint compounds.

To produce the electrical joint compound, the above groups of amines and amides are treated with hydrofluoric acid, preferably in the anhydrous condition. It is usually most convenient to vaporize the acid and bubble the vapor through the amine or amide in liquid condition as it is being agitated. It may be necessary to warm the amine or amide to render it liquid or fluid enough for treatment with the acid vapor. The particular manner in which the acid is brought into contact with the amines and amides forms no part of this invention. It is important, however, that the contact with the acid should be continued for a long enough time to leave an appreciable quantity of acid associated with the amine, that is, enough to provide a product which will cause a substantial reduction in the contact resistance between metallic electrical conductors. For practical purposes it has been found that the hydrofluoric acid content should not be less than 0.5% by weight of the treated amine or amide. On the other hand, there is no further improvement in performance of the compound when the acid content exceeds 20% by weight of the treated material within this range. The amount of hydrofluoric acid added will be determined by the nature of the amine or amide, the degree of activity desired in the final product and whether or not the product is to be diluted with inert material. The proper amount of hydrofluoric acid to be used in any particular instance can be easily ascertained by a few tests.

A single undiluted compound may be applied to the metallic conductors or a mixture of two or more may be used. In some instances it may be desirable to apply the compound or mixture in successive layers and use the same or different compounds in the several layers. The selection of any compound or compounds will be influenced by cost, ease of application and relative effectiveness under service conditions.

The advantages gained through use of the compounds are also realized when they are diluted with an inert fluid material such as an oil or grease with which they are miscible. Generally it is more economical to dilute the compounds providing the diluent remains in place in the joint and does not react with the joint compounds. It is easy to prepare mixtures containing the compounds if they are miscible with the diluent. Greases and oils available in the market are satisfactory for this purpose. They are usually mixtures of hydrocarbons of natural or synthetic origin and may in some cases contain other substances to improve certain properties. However, they are here referred to as fluid hydrocarbon materials. The amount of grease or oil employed may vary with the amine or amide and the quantity of hydrofluoric acid associated therewith. Broadly, the grease or oil content of the mixture may be as high as 75% by weight of the mixture. Very satisfactory mixtures have been made which contain 45 to 60% of heavy petrolatum or petroleum jelly, and the balance an electrical joint compound.

In order to obtain a low enough viscosity for easy application of such mixtures or the compounds, it may be desirable to incorporate therewith a readily vaporizable solvent or carrier such as mineral spirits. Such viscosity-reducing additions should quickly evaporate and leave the compound or grease or oil mixture in place. The use of hydrocarbon greases and oils is preferred to other diluents because of their insolubility in water in addition to considerations of economy and inertness toward the joint compounds. Since the mixture of treated amine or amide and the diluent resists solution by water into the joint and therefore it is well adapted to exposure to weather or under conditions which bring moisture into contact with the electrical joint.

Although the electrical joint compounds may be used in a mechanical joint between any solid metallic conductors, they have proved to be especially valuable when used on those conductors which are coated with a natural oxide film. For example, they have been found to be particularly effective in reducing the electrical resistance in mechanical joints between aluminous conductors, particularly in bus bar installations. The term "aluminous" is here used to designate both aluminum and the alloys containing more than 50% by weight of this metal. The tenacious oxide film on aluminous conductors forms so readily that it has been impossible to establish a direct metal to metal contact in a mechanical joint even though the metal is first cleaned and a heavy pressure is applied to the conductors at the joint. Through use of the electrical joint compounds herein described the electrical resistance in such joints is very greatly reduced. Obviously, this is of considerable importance in a transmission system where there are numerous mechanical joints. Considerable reduction in contact resistance is effected by the use of the joint compounds between conductors of copper and copper base alloys, tin or cadmium plated copper, steel and aluminum, as well as between aluminous and other non-aluminous conductors.

While the compounds can be successfully used on metal surfaces which are dirty or greasy, it is preferable to clean them first to assure maximum benefit from the compounds. Either chemical or mechanical cleaning will be satisfactory. Also, it is advisable to have the conductors as dry as possible when the compounds or mixtures containing the compounds are initially applied.

Preliminary to assembling a mechanical joint containing a compound of the kind herein described the compound or mixture containing the compound is applied to the surface of at least one of the conductors forming the mechanical joint. Application in that manner will ordinarily provide sufficient compound between the overlapping surfaces of adjacent conductors to lower the contact resistance. The compounds may be applied to the conductors in any suitable manner, such as by painting, or daubing, or by immersion in the liquid. The amount applied is not critical except that for best results the entire area of the overlapping surfaces should be covered with the compound when the conductors are assembled in joint relationship. Generally, the compounds have no adverse effect upon the metal and hence any excess outside of the joint need not be removed. After the compounds have been applied the conductors can be assembled in joint relationship and held in position by clamps, bolts, or other means of establishing and maintaining firm contact between the conductors. In the case of attaching a fitting to cable, the compound may be applied to the cable and the fitting then compressed on the cable. The method of applying the joint compound and assembling the conductors is covered in my co-pending application Serial No. 169,293, filed June 20, 1950.

The effect gained by interposing an electrical joint compound between the overlapping surfaces of electrical conductors is illustrated in the following examples. In these tests the contact resistance was magnified, as compared to the resistance between a pair of conductors, by stacking six wafers of aluminum of a minimum purity of 99.3% between bars of the same metal. The wafers were 7/8" square and 1/8" in thickness. One surface of each wafer was grooved so that only about 50% of the total surface area would contact the back of the adjoining wafer or bar. This arrangement served to accentuate any contact resistance effects. The bars were of the same width as the wafers and were 1/4" in thickness. The assembly was mounted in a fixture and pressed together by tightening nuts on bolts with a torque wrench so that a pressure of 3500 lbs. was applied to the joint. In order to provide the same kind of metal surface for each test, the wafers and bars were first etched in a 5% NaOH aqueous solution for 10 minutes, removed and immersed in a 50% $HNO_3$ solution for 5 seconds, after which they were withdrawn, washed and dried. An initial test was made of the assembly without any compound between the contacting surfaces. In each of the subsequent tests the amine or amide treated with different amounts of HF was painted or daubed on one surface of each wafer or bar so that the compound would be present at each contacting surface on the assembly. The resistance was measured at room temperature by observing the potential drop across the joint under a current of about 3 amperes. The resistance values of 2 or more tests were thus determined and an average value computed. The joint compounds and mixtures tested and the average resistances observed were as follows:

*Electrical resistance of test joints*

| Composition of substance in joint: | Average resistance in microhms |
|---|---|
| None | 98.5 |
| Petrolatum | 71.4 |
| 45% substituted oxazoline having mol. wt. of 350, 5% HF and 50% petrolatum | 11.1 |
| 30% 1-hydroxyethyl-2-heptadecenyl glyoxalidine, 3.3% HF, 33% petrolatum and 33.7% mineral spirits | 11.5 |
| 76% substituted 2-heptadecylimidiazole, 8.5% HF and 15.5% ethylene bis-aminodiacetic acid | 10.0 |
| 47.5% secondary dodecylamine, 2.5% HF and 50% petrolatum | 10.0 |
| 45% substituted oxazoline having mol. wt. of 350, 5% HF, 1% n-octadecane amide and 49% petrolatum | 17.5 |
| 15.5% 4-amino-3-pentadecyl phenol, 1% HF, 50% petrolatum and 33.5% mineral spirits | 46.0 |
| 90% phenylethanolamine and 10% HF | 10.0 |
| 95% substituted oxazoline having mol. wt. of 350 and 5% HF | 8.1 |
| 22.5% substituted oxazoline, 2.5% HF and 75% petrolatum | 10.5 |
| 29.4% octylphenoxyethoxyethyldimethylamine, 13.6% ethyleneiminodiacetic acid, 7% HF and 50% petrolatum | 18.0 |
| 31.5% stearyldimethylamine, 14.8% ethylene bis-imino-diacetic acid, 3.7% HF, and 50% petrolatum | 11.5 |

It will be seen that the joints containing the treated amines had a very low resistance as compared to the bare joint, even where the compound was diluted with a substantial proportion of petrolatum. Field tests have confirmed the marked reduction in electrical resistance between aluminum conductors.

Having thus described my invention and certain embodiments thereof which serve as illustrations and not limitations I claim:

1. An anhydrous composition of matter which when placed in a joint between solid metallic electrical conductors, serves to reduce the electrical resistance between said conductors, said composition containing as its essential and sole active component a reaction product of anhydrous hydrofluoric acid and a substituted oxazoline containing not less than eight carbon atoms, the substituents in said substituted oxazoline being selected from the class of straight chain groups composed of carbon and hydrogen and carbon, hydrogen and oxygen, said hydrofluoric acid being reacted with said substituted oxazoline without decomposition, the amount of hydrofluoric acid in said reaction product being between 0.5 and 20% by weight of the reaction product, said reaction product being characterized by insolubility in water and miscibility in hydrocarbon grease and oil.

2. An anhydrous composition of matter which when placed in a joint between solid metallic electrical conductors, serves to reduce the electrical resistance between said conductors, said composition containing as its essential and sole active component a reaction product of anhydrous hydrofluoric acid and a substituted oxazoline having a molecular weight of at least 300 wherein the substituents in said substituted oxazoline consist of a group selected from the class composed of alkyl and oxyalkyl groups, said hydrofluoric acid being reacted with said substituted oxazoline without decomposition, the amount of hydrofluoric acid in said reaction product being between 0.5 and 20% by weight of the product, said reaction product being characterized by insolubility in water and miscibility in hydrocarbon grease and oil.

3. An anhydrous composition of matter which when placed in a joint between solid metallic electrical conductors serves to reduce the electrical resistance between said conductors, said composition consisting of a fluid hydrocarbon of the group consisting of grease and oil and a reaction product of anhydrous hydrofluoric acid and a heterocyclic amine containing not less than eight carbon atoms wherein the acid undergoes no decomposition, said hydrofluoric acid being present in the reaction product in an amount of between 0.5 and 20% by weight of the product, said reaction product being characterized by insolubility in water and miscibility in hydrocarbon grease and oil.

4. An anhydrous composition of matter which when placed in a joint between solid metallic electrical conductors serves to reduce the electrical resistance between said conductors, said composition consisting of up to 75% by weight of a fluid hydrocarbon of the group consisting of grease and oil and the balance a reaction product of anhydrous hydrofluoric acid and a substituted oxazoline having a molecular weight of at least 300 wherein the substituents in said substituted oxazoline consist of a group selected from the class composed of alkyl and oxy-alkyl groups, the amount of hydrofluoric acid in said reaction product being between 0.5 and 20% by weight of the product, said reaction product being characterized by insolubility in water and miscibility in hycarbon grease and oil.

5. An anhydrous composition of matter which when placed in a joint between solid metallic electrical conductors serves to reduce the electrical resistance between said conductors, said composition consisting of 45 to 60% by weight of petrolatum and the balance a reaction product of anhydrous hydrofluoric acid and a substituted oxazoline having a molecular weight of at least 300 wherein the substituents in said substituted oxazoline consist of a group selected from the class of alkyl and oxy-alkyl groups, said hydrofluoric acid being reacted with said substituted oxazolines without decomposition, the amount of hydrofluoric acid present in said reaction product being between 0.5 and 20% by weight of the product, said reaction product being characterized by insolubility in water and miscibility in hydrocarbon grease and oil.

6. An anhydrous composition of matter which when placed in a joint between solid metallic electrical conductors serves to reduce the electrical resistance between said conductors, said composition consisting of a reaction product of anhydrous hydrofluoric acid and a substituted oxazoline having a molecular weight of at least 300 wherein the substituents in said substituted oxazoline consist of a group selected from the class composed of alkyl and oxy-alkyl groups, said hydrofluoric acid being reacted with said substituted oxazoline without decomposition, the amount of hydrofluoric acid present in the reaction product being between 0.5 and 20% by weight of the product, said reaction product being characterized by insolubility in water and miscibility in hydrocarbon grease and oil.

References Cited in the file of this patent

UNITED STATES PATENTS

| | | |
|---|---|---|
| 1,768,910 | Ihrig | July 1, 1930 |
| 2,155,307 | Hageman et al. | Apr. 18, 1939 |
| 2,214,152 | Wilkes | Sept. 10, 1940 |
| 2,238,069 | Miller | Apr. 15, 1941 |
| 2,266,060 | Miller | Dec. 16, 1941 |
| 2,286,298 | Miller | June 16, 1942 |
| 2,291,400 | Miller | July 28, 1942 |
| 2,330,904 | Miller | Oct. 5, 1943 |

OTHER REFERENCES

Weinland: Zeit. Anorg. Chemie, vol. 45, pp. 39–51 (1905).

Berichte, vol. 41, pp. 3671–3674 (1908). (Copy in Sci. Lib. of U. S. Patent Off.)

Wenker: JACS, vol. 60, September 1938 pp. 2152–2153.

McBee et al.: Ind. and Eng. Chem., vol. 39, pp. 389–392, March 1947.